United States Patent [19]

Shaffer

[11] Patent Number: 5,898,668
[45] Date of Patent: Apr. 27, 1999

[54] METHOD AND SYSTEM FOR INCREASING QUALITY OF SERVICE AT OR BELOW A THRESHOLD COST

[75] Inventor: Shmuel Shaffer, Palo Alto, Calif.

[73] Assignee: Siemens Information and Communication Networks, Inc., Boca Raton, Fla.

[21] Appl. No.: 08/768,168

[22] Filed: Dec. 13, 1996

[51] Int. Cl.$^6$ .................................................. H04Q 11/00
[52] U.S. Cl. ........................ 370/230; 370/252; 370/437; 370/465
[58] Field of Search ..................... 370/229, 230, 370/231, 232, 233, 234, 235, 236, 237, 238, 248, 252, 253, 354, 355, 437, 466, 467, 468, 469, 465, 259; 395/200.57, 200.58, 200.59, 500

[56] References Cited

U.S. PATENT DOCUMENTS

| | | | |
|---|---|---|---|
| 5,072,441 | 12/1991 | Szwarc | 370/389 |
| 5,119,367 | 6/1992 | Kawakatsu et al. | 370/232 |
| 5,231,649 | 7/1993 | Duncanson | 375/260 |
| 5,251,209 | 10/1993 | Jurkevich et al. | 370/468 |
| 5,263,025 | 11/1993 | Torii et al. | 370/468 |
| 5,301,303 | 4/1994 | Abraham et al. | 395/500 |
| 5,408,465 | 4/1995 | Gusella et al. | 370/231 |
| 5,446,730 | 8/1995 | Lee et al. | 370/351 |
| 5,485,455 | 1/1996 | Dobbins et al. | 370/255 |
| 5,490,141 | 2/1996 | Lai et al. | 370/352 |
| 5,491,694 | 2/1996 | Oliver et al. | 370/455 |
| 5,537,404 | 7/1996 | Bentley et al. | 370/384 |
| 5,583,860 | 12/1996 | Iwakawa et al. | 370/232 |
| 5,694,548 | 12/1997 | Baugher et al. | 395/200.57 |

*Primary Examiner*—Chi H. Pham
*Assistant Examiner*—Kwang B. Yao
*Attorney, Agent, or Firm*—Heather S. Vance

[57] ABSTRACT

A method and system for managing the routing of communications data, such as real-time multimedia exchanges between remote sites, includes monitoring various communications modes, with each mode having pre-established quality of service parameter values and a pre-established session tariff. Some of the modes provide variable quality of service. The variable modes are monitored continuously to determine present-time quality of service parameter values. When a request to establish a communication session is received, the request will specify quality of service requirements. An acceptable session tariff is calculated based upon the match of the specified requirements with the pre-established parameter values of the modes. In a preferred embodiment, the next step is to select that mode having the highest quality of service available for a session tariff that does not exceed the predefined acceptable session tariff. In this embodiment, the tariff of the selected mode may be greater than an alternative mode that satisfies the QoS requirements, but only if the selected mode has a greater QoS. In another embodiment, real-time multimedia sessions are conducted using available modes that include the global Internet, and the session tariff becomes more of a factor. In a third embodiment, the user identifies a QoS level and an acceptable session tariff, and the system notifies the user when present-time quality of service is available at the acceptable session tariff.

20 Claims, 5 Drawing Sheets

METHOD AND SYSTEM FOR INCREASING QUALITY OF SERVICE AT OR BELOW A THRESHOLD COST

BACKGROUND OF THE INVENTION

The invention relates generally to methods and systems for managing communications routings between remote sites and more particularly to selecting among a number of communications modes accessible to the system.

DESCRIPTION OF THE RELATED ART

There are an increasing number of communications modes for conducting communications sessions, such as real-time multimedia connections. The differences in the modes may be medium-based, protocol-based and/or service-based, for example. A medium-based mode difference relates to the physical layer of communications between remote sites. A common physical medium for communications from a site within a local area network (LAN) to a site outside of the network is an analog line leased from a telecommunications provider. Another physical medium is a fiberoptic line, such as the digital data transmission lines of a synchronous optical network (SONET).

A protocol-based difference in communications modes is at a higher layer than medium-based differences. Within the global Internet, Transmission Control Protocol (TCP) is relied upon at a transport layer, and Internet Protocol (IP) is relied upon at a network layer. However, alternative protocols are available and are used within other digital communications modes and in analog communications modes.

Differences within communications modes may be related to whether network interfaces are packet-switched or circuit-switched. Synchronous Transfer Mode (STM) technology provides a circuit-switched network mechanism in which a connection is established and maintained between two remote sites to initiate the communications session, and the connection is torn down following the session. On the other hand, Asynchronous Transfer Mode (ATM) is a high bandwidth cell-switching technology that is used to provide fixed-size cells for transmitting voice, video, data and other information. The protocol for ATM may be IP and the physical layer may be a SONET link. Another important technology related to this type of mode differentiation is the Frame Relay, which provides fast packet multiplexing and is designed to accommodate efficient wide area networks (WANs).

Within the ATM environment, various service-based communications modes may be implemented. For example, basic-rate Integrated Services Digital Network (ISDN) provides use of two B-channels and a single D-channel to residences and businesses that are provided with a basic-rate interface. A higher bandwidth ISDN service is provided by a primary-rate ISDN interface that consists of twenty to thirty B-channels for user data and a single D-channel for signaling. Broadband ISDN provides even higher transmission speeds. Broadband ISDN is supported by transmission technologies other than ATM. Moreover, the non-ATM technologies support services that are not available in the ATM environment.

A sub-category of the service-based communications modes relates directly to throughput, i.e., the effective network transmission speed, or bandwidth. A committed bit rate (CBR) service provides a set throughput with a low and stable delay. On the other hand, available bit rate (ABR) service provides users with a bandwidth suitable for supporting a particular communications session. The network will provide connectivity for the session based upon the requested parameter values. Typically, the throughput for an ABR service varies with the traffic at the time of the session. However, there is an "advertised" bandwidth that provides a guaranteed throughput for a session. For example, in an ATM network, the transmissions may be guaranteed to travel at 10 Mbit/second, with bursts of 45 Mbit/second for times in which the use of network resources is low.

In addition to having an "advertised" bandwidth, most communications modes have advertised parameter values for other factors related to quality of service (QoS). An important quality of service parameter is cell or packet loss. Within an ATM environment, data is transmitted in cells having a length of 53 bytes, with 5 bytes being used as a header and the remaining 48 bytes comprising the payload. Cell loss will adversely affect the quality of service. Another parameter of concern is time delay, sometimes referred to as "latency." Still referring to the ATM environment, latency is a measure of time required for a cell to reach a receiving station. A related parameter is "jitter," which is the variation in latency for different cells.

Real-time multimedia communications over networks, such as the global Internet, have become more cost effective than multimedia communications over the public switching telephone network (PSTN). However, the quality of the communications, such as voice quality and video quality, depends upon the selection of communications modes and upon traffic along the network, if the mode is an ABR service. Static routing of single-medium and multimedia communications over an integrated network is well known. For static routing, the user specifies the quality of service requirements and the integrated network negotiates connectivity based upon conditions at the time that the request is received. During the session, the traffic may change significantly and the quality of service may drop below the requested level. The users may continue with the low quality communication or may disconnect and then re-establish the communication. Since the initial negotiation is typically to find the communications mode having the lowest tariff with the required level of QoS, the re-established communication is likely to be fixed at a higher tariff.

Within some networks, renegotiation of quality of service may be implemented during a session. If video information is to be transmitted during a session that was originally connected for voice-only, advanced networks may allow the user to initiate a renegotiation that establishes a second connection before the original connection is torn down. The second connection utilizes communications modes suitable for the increased QoS requirements.

A more complex in-session renegotiation is described in U.S. Pat. No. 5,446,730 to Lee et al. The method described in Lee et al. provides dynamic connection management in an integrated communications network. Re-optimization may take place for cost improvement. As previously noted, the tariff (i.e., cost) of connectivity depends upon the selected communication modes, and the tariffs are typically inversely proportional to the guaranteed quality of service. The patent to Lee et al. states that because of changes in the network or changes in the supporting connections, the cost of a given connection may not be minimal for the entire session. After a link fails, connections are re-established over paths with potentially higher costs. The re-optimization of Lee et al. prevents the connections from being fixed within the unnecessarily costly paths. The re-optimization may be triggered by a network administrator, by passage of a set period of time, or by the time of day. For re-optimization, all agreed performance values and effective resource constraints must not be degraded, and the cost must be reduced sufficiently to justify the process. Another feature of Lee et al. is enhancement. Enhancement is utilized to guarantee that negotiated performance values extend over the duration of the session. The network monitors changes in the network and provides renegotiation when the quality of service degrades. The renegotiation does not consider the cost of the connection.

Monitoring a network is also described in U.S. Pat. No. 5,408,465 to Gusella et al. The results of the monitoring are employed at the original setup level of a session, rather than for renegotiation. The monitoring is used as a basis for predicting the quality of service for the duration of a session. Predicted values are utilized while attempting to find a path that satisfies the requirements of a particular communication.

The prior techniques for predicting quality of service for the duration of a session requesting establishment and the prior techniques for re-establishing connections in response to detection of degraded quality of service or reduced tariff provide significant advantages to network users. The common theme is to provide a minimal cost for a session by minimally satisfying quality of service requirements.

What is needed is a method and system that maximize the quality of service at a tariff that is acceptable to users.

SUMMARY OF THE INVENTION

A method and system for managing the routing of communication data between remotely located sites includes monitoring various communications modes, with each mode having pre-established quality of service parameter values and a pre-established session tariff. By monitoring at least those modes that have variable quality of service, the present-time quality of service parameter values are known. Upon receiving a request to establish a communication session having specified quality of service requirements, the pre-established parameter values may be used as a basis for calculating a session tariff that is acceptable to the users. The present-time quality of service parameter values may then be used to select modes that provide the highest present-time quality of service at or below the calculated acceptable session tariff. In this embodiment, the monitoring is for the purpose of maximizing the quality of service that is available at a calculated maximum tariff. However, connectivity resources of a second mode having pre-established parameter values which satisfy the request preferably are reserved in order to accommodate the session if the present-time quality of service of a selected mode degrades. That is, resources are reserved to allow fallback connectivity on an "as-needed" basis.

In the preferred embodiment, the monitoring of the communications modes is continuous and in-session switching between modes is executable. The in-session switching occurs in response to detecting a condition in which an alternative mode provides a higher present-time quality of service at a session tariff no greater than the calculated acceptable session tariff. Alternatively, if the quality of service of the originally selected mode degrades to a level below the quality of service requirements of the session, an alternative mode that satisfies the requirements at an acceptable session tariff is substituted. Preferably, if the switching takes place between two modes that both have present-time quality of service parameter values satisfying the requirements, the method includes a step of weighting the pre-established session tariffs to prevent reconnection costs from increasing the total session tariff to a level above the acceptable session tariff.

In another embodiment, the communications sessions are real-time transmissions of multimedia data and in-session switching among modes is executed to achieve cost-efficiency while providing a present-time quality of service satisfying the requested requirements of the multimedia session. In this embodiment, at least some of the modes are distinguishable with respect to protocol and one of the available protocols is the Internet Protocol. Other modes may be distinguishable with respect to transmission media, including analog lines and digital lines.

A third embodiment may be used for communications sessions that are not schedule-critical, i.e., situations in which a user is willing to wait for the start of a session in order to take advantage of low traffic circumstances. In this embodiment, each communications mode has a pre-established session tariff and each mode is monitored to determine the present-time quality of service of the mode. The request by a user to establish a communications session indicates a minimum quality of service and a maximum session tariff. The indication of the maximum session tariff may be inferred from a request for a particular mode. If one of the modes satisfies the indicated minimum quality of service within the indicated maximum session tariff, the connectivity is established using that mode. On the other hand, if none of the modes satisfies the indicated minimum quality of service within the maximum tariff, the request is queued and the present-time quality of service parameter values of the various modes are tracked until a specific mode has a present-time quality of service that satisfies the indicated minimum quality of service within the indicated maximum session tariff. The user is then notified of the availability of resources that provide the quality of service at the desired tariff.

DETAILED DESCRIPTION

Figure 1:
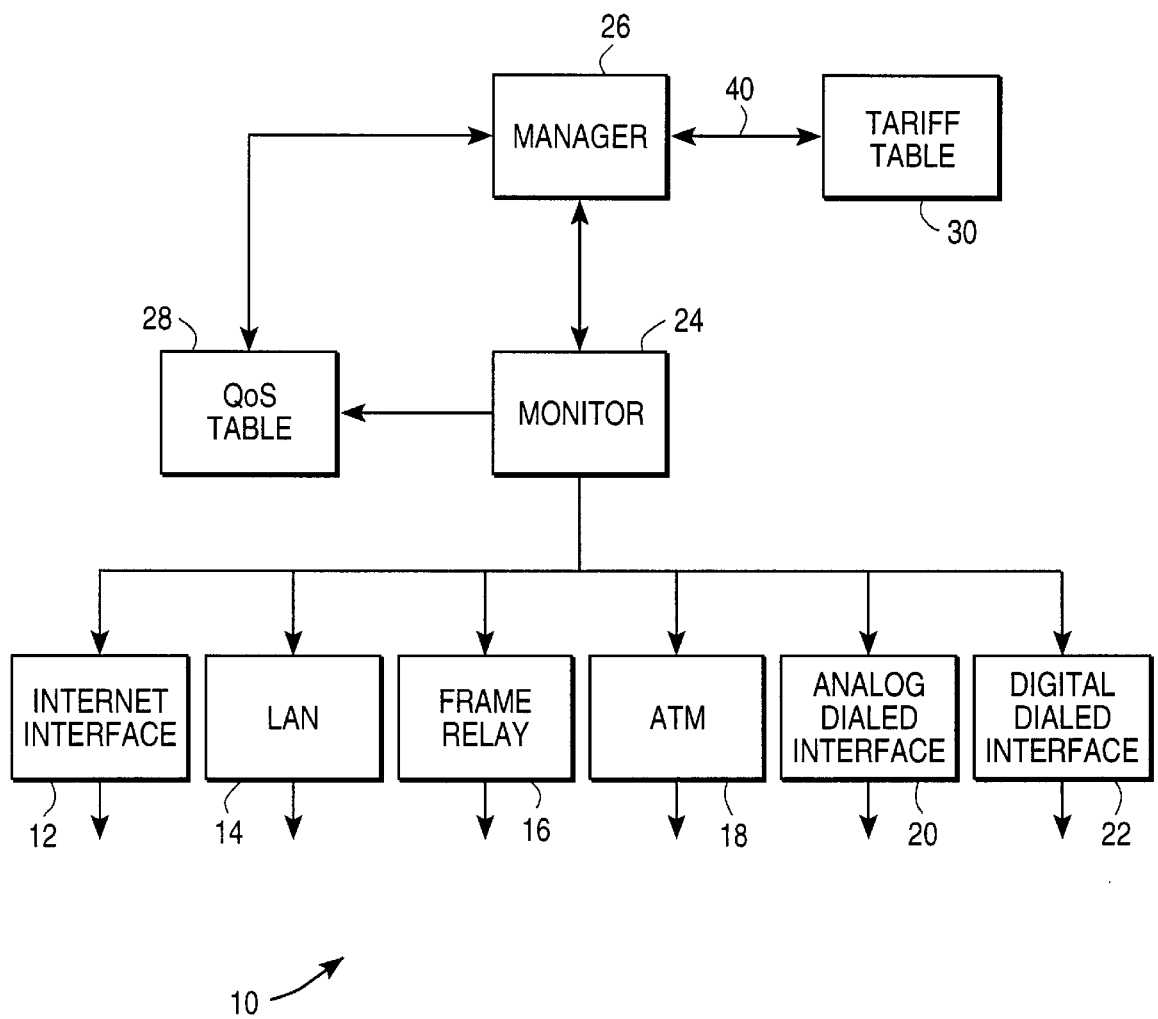
FIG. 1 is a block diagram of a system for managing real-time communications sessions, with the system including interfaces compatible with different communications modes in accordance with the invention.

With reference to FIG. 1, an integrated network 10 has the capacity to select among various communications modes for conducting communications sessions between remote sites, not shown. In the preferred embodiment, the network is a system for real-time multimedia communications, such as video and voice data of a telecommunications conference. The components of FIG. 1 are network components that determine the quality of service (QoS) of the sessions.

The difference between communications modes may be any one or all of medium-based, protocol-based and service-based differences. Moreover, the mode difference between two alternatives may be a difference between packet switching and circuit switching. FIG. 1 shows six alternatives. An Internet interface 12 may be a modem for connecting one video conference site to another video conference site via an Internet Service Provider (ISP). Alternatively, the sites may be both located on the premises of a corporation, so that the sites can be connected via a corporate local area network (LAN) 14. A Frame Relay 16 and an ATM interface 18 illustrate two other possible communications modes. Alternatively, an analog dialed interface 20 and a digital dialed interface 22 are shown in FIG. 1. The analog dialed interface and the digital dialed interface may be connected to separate leased lines of a public switched telephone network (PSTN).

Each one of the communications modes has at least one "advertised" quality of service that provides guarantees for a session. For some modes, there may be more than one advertised quality of service. For example, ATM offers at least three such levels at different session tariffs. The quality of service may also be measured in terms of packet losses, latency and/or jitter. For some of the communications modes available in FIG. 1, the quality of service parameters are relatively fixed. For example, the digital dialed connections may be associated with a fixed throughput of 128 kbps. On the other hand, quality of service of other modes may fluctuate significantly. As one example, the connection via the Internet interface 12 will fluctuate significantly depending upon traffic. While the "advertised" quality of service may be a guaranteed delay of 30 milliseconds, the actual delay may be 15 milliseconds, if the traffic along the communication lines is low.

Within many prior art techniques, a system for establishing real-time communications sessions considers only the guaranteed quality of service parameter values. This provides assurance that the quality of service will remain at a requested level throughout the entire session. Quality of service requirements may relate to various parameters, including packet loss, delay, jitter, priority and security. At the initiation of a session, the quality of service requirements are received and matched with parameter values associated with the different communications modes. The appropriate mode is selected and utilized to implement the session.

In the preferred embodiment of the invention, the integrated network 10 of FIG. 1 accesses the guaranteed quality of service values of the various alternative modes in order to determine an acceptable session tariff, but monitors the actual (i.e., present-time) quality of service for all of the other available modes. The monitoring is continuous, so that in-session mode switching is enabled. A monitor device 24 is connected to the individual network access points 12, 14, 16, 18, 20 and 22 for accessing the different communications modes. As will be explained more fully below, a mode manager 26 controls the connectivity and receives data from a QoS table 28 and a tariff table 30.

Figure 2:
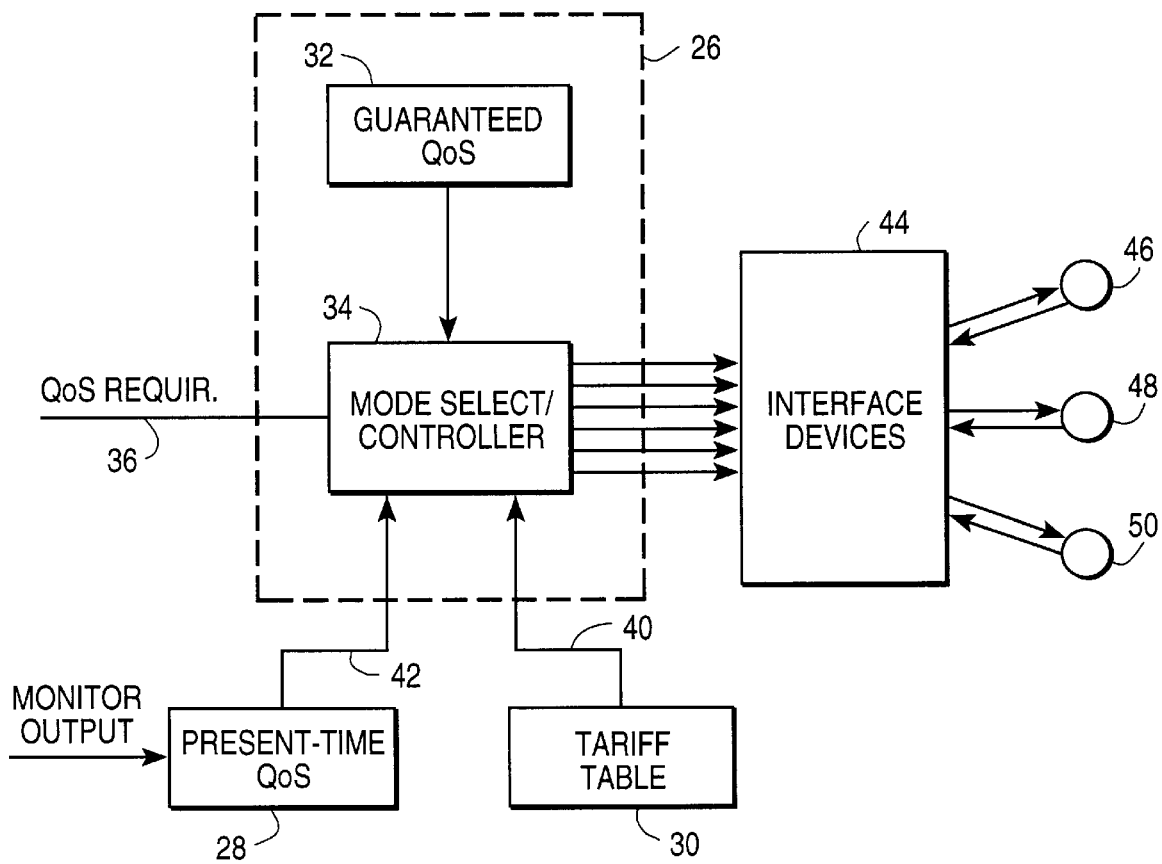
FIG. 2 is a block diagram of the manager device of FIG. 1 with connections to the input and output devices.

Referring now to FIG. 2, the manager device 26 includes memory 32 for the pre-established guaranteed QoS parameter values for the various communications modes. The memory provides information to a mode select/controller device 34. The mode select operation of this device is similar to the operations of prior art devices for negotiating a connection path for communications on a session-by-session basis. The mode select/controller device includes an input 36 for identifying quality of service requirements for a particular session. In the preferred embodiment, the integrated network accommodates real-time multimedia sessions. Thus, the quality of service requirements will typically relate to a combination of voice, video, image and data parameters. The mode select/controller device 34 matches the quality of service requirements with parameter values of the available communications modes in order to select a mode that will function as a "fallback" mode for the session. Resources of the fallback mode are reserved and are then utilized on an "as-needed" basis, ensuring that resources are available throughout the session.

A second input 40 of the mode select/controller device is the information from the tariff table 30, which stores identification of the costs of utilizing the different modes available to the integrated network. Often, the tariffs are not fixed. For example, analog leased lines are typically less costly to use during off-hours, such as weekends. The tariff table preferably has sufficient information to allow an accurate identification of the present-time tariff for each of the available modes.

If more than one available mode is identified by the mode select/controller device 34 as satisfying all of the QoS requirements for a particular session, the mode select/controller device 34 determines which of the designated modes is the least expensive to implement. The tariff that is associated with this mode is then identified as the "acceptable session tariff," since the QoS requirements at input 36 necessarily carry this session tariff as a minimum. This mode is identified as the fallback mode, and the necessary communications resources are reserved, as previously noted.

The mode select/controller 34 has a third input 42 from the present-time quality of service table 28. As previously noted, the monitor device 24 of FIG. 1 is connected to each of the network access points 12, 14, 16, 18, 20 and 22. The monitor device may utilize any of known techniques for determining actual quality of service parameter values. For example, received packets containing multimedia information of other sessions may be monitored for the time of arrival. In addition, the length of a buffer queue feeding to a multimedia decoder is monitored. Of special interest is the case in which the buffer queue is empty as a result of a packet being lost or delayed through the network. Monitor device 24 collects statistical information relating to quality of service, e.g., delay, latency, jitter and data loss. Depending upon the type of communication (e.g., voice, video, image or data) and the decoding mechanism used, the impact to the quality of service from the delayed arrival or lost packets is assessed. This assessment is used to update the present-time quality of service table 28.

In the preferred embodiment, the mode select/controller 34 determines whether a higher quality of service is available for individual sessions without exceeding the determined acceptable session tariff. For example, if the global Internet is providing an unusually high quality of service because of the low present-time traffic, its QoS parameter values may satisfy all of the requirements of a particular session at an equal tariff, or perhaps a lower tariff. While the originally selected mode may satisfy all of the requirements, the mode select/controller preferably switches the session to the mode that offers the higher quality. However, in the preferred embodiment, the tariff table 30 also identifies the cost of switching connectivity, so that this may be factored into the determination as to whether the mode switch is desirable. The mode select/controller is connected to all of the interface devices 44 and enables the devices on a session-by-session basis to connect various multimedia sites 46, 48 and 50 over the selected communications mode.

Figure 3:
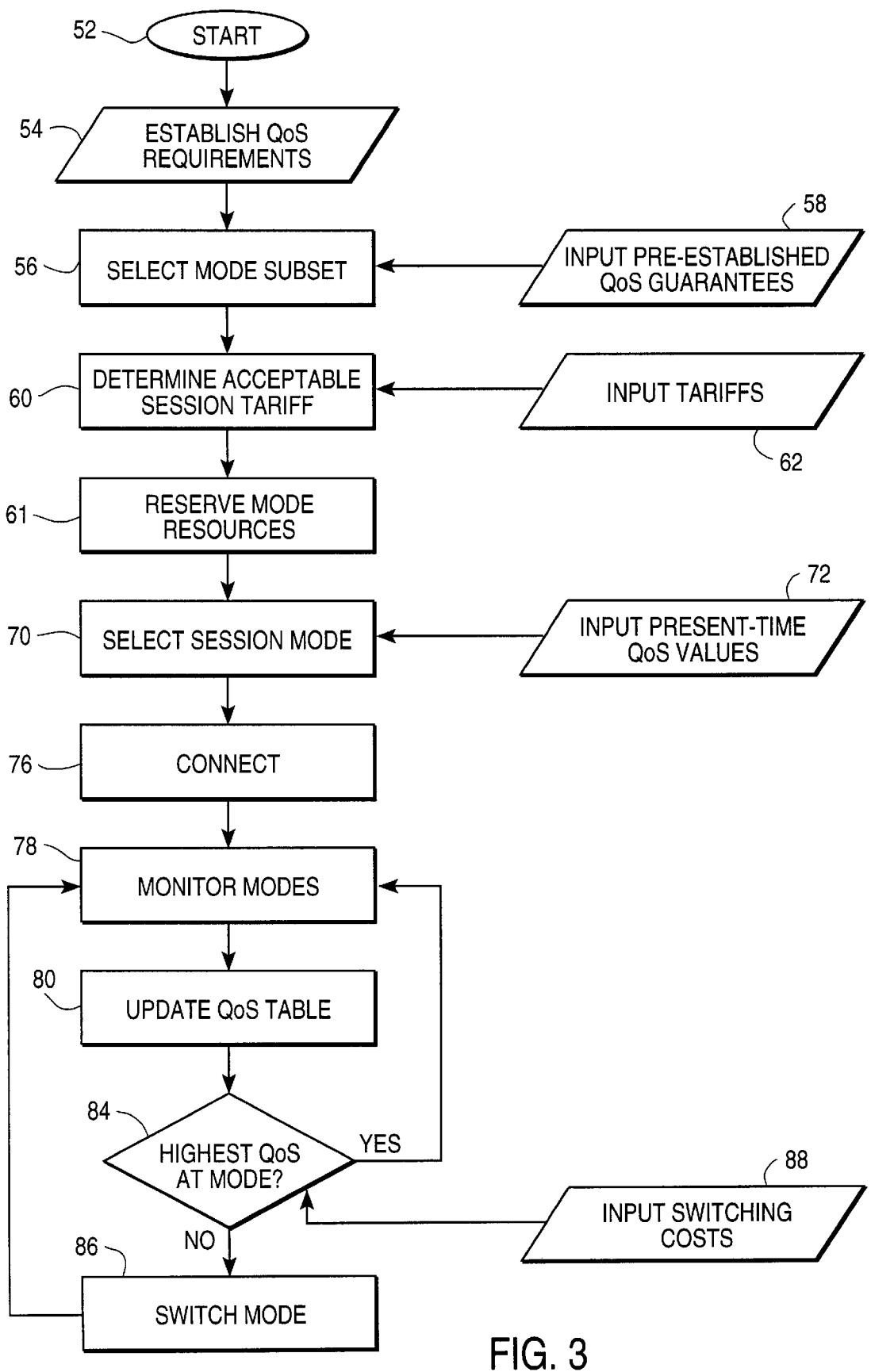
FIG. 3 is a flow chart of steps for selecting among the communications modes accessible via the system of FIG. 1, in accordance with one embodiment of the invention.

The steps for the preferred embodiment are shown in FIG. 3. At a start 52 of a process for initiating a communications session, such as a real-time multimedia session, the QoS requirements are established at step 54. This step may be executed by a direct input of desired quality of service by a calling party. Alternatively, the QoS requirements may be established by inferring the desired quality of service based upon the type of call (e.g., a videoconference) and/or based upon the identity of the calling party. For example, a table of "inferred" QoS requirements may be stored and then accessed on a session-by-session basis. In FIG. 2, the QoS requirements are input to the mode select/controller device 34 at input line 36.

In step 56, the mode select/controller device 34 compares the QoS requirements of the session to the pre-established quality of service guarantees of the various available interface devices 44. These QoS guarantees are continuously available at step 58. The comparison of the QoS requirements and QoS guarantees typically will result in a preliminary selection of at least one available mode that satisfies all of the QoS requirements of the session.

Figure 4:
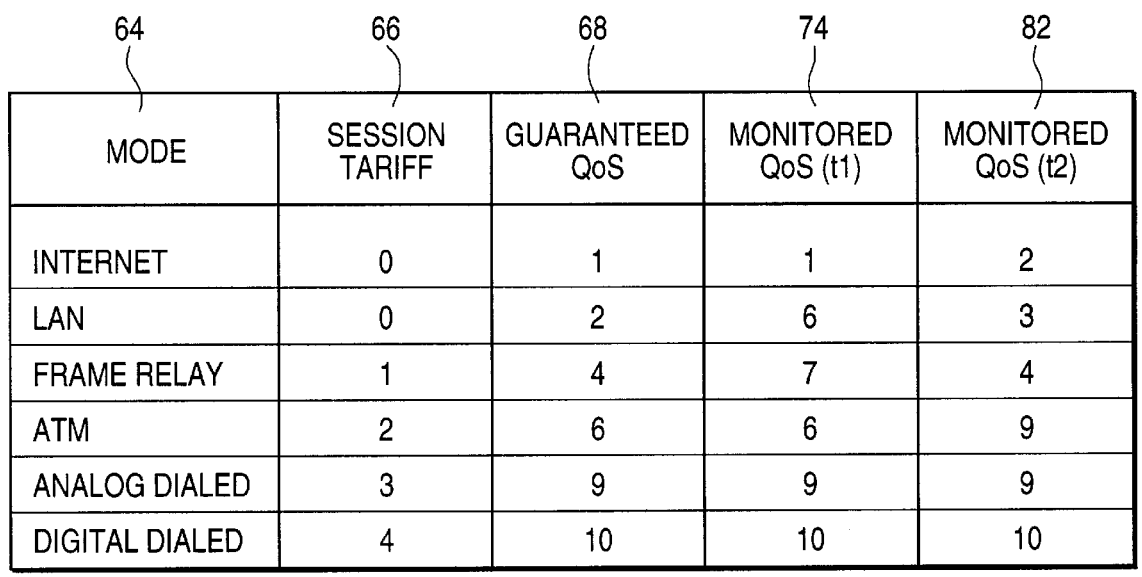
FIG. 4 is a table of values formed using the process of FIG. 2.

The one or more preliminarily selected modes are used to determine an acceptable session tariff at step 60. In the embodiment of FIG. 2, the determination of the acceptable session tariff is executed at the mode select/controller 34 with an input 40 from the tariff table. This input step is shown at 62 in FIG. 3. The "acceptable session tariff" is defined as the least expensive tariff for implementing the session using a mode having QoS guarantees that satisfy all of the QoS requirements. Referring now to FIG. 4, the mode select/controller may be used to construct a table having a first column 64 that identifies the available modes for implementing the session. The second column 66 may be used to identify the present-time session tariffs for the various modes, while the third column 68 stores the guaranteed QoS for the modes. The column values have been simplified for the purpose of explanation. All of the values represent values on scales having a lowest parameter value of 0 and highest parameter value of 10. Typically, a multi-media session will identify a number of different QoS parameters of concern. Moreover, the exemplary table does not show that some modes (e.g., ATM) may actually be multiple modes with different QoS guarantees.

Using the simplified table of FIG. 4, if the QoS requirements input at step 54 define a QoS parameter value of 6, the selected mode subset at step 56 will comprise the ATM connection, the analog dialed connection and the digital dialed connection. Then, the determination of an acceptable session tariff in step 60 will be the designation of tariff value 2, since the ATM connection in the table of FIG. 4 is the least expensive of the three connections that guarantee to satisfy the QoS requirements of the session. The ATM mode is identified as the fallback mode from which resources are reserved for use on an as-needed basis The steps of selecting a mode subset 56 and determining the acceptable session tariff 60 are executed at the mode select/controller 34 of FIG. 2. In another control operation, the connectivity resources of one of the modes (i.e., the fallback mode) are reserved at step 61 in order to ensure that the QoS requirements will be satisfied throughout the communications session. The mode from which the resources are reserved is that mode that has QoS guarantees satisfying the QoS requirements of the session with the least expense. In the example immediately above in which the required QoS parameter value was "6," connectivity resources for the ATM mode will be reserved, since the ATM connection provides the least expensive connection of the three modes having the required QoS guarantees. While the resources remain reserved, the resources are not necessarily utilized.

In the next step 70, one of the modes is selected for implementing the session. In practice, there may be more than one selection, since there is more than one layer in the connectivity scheme, e.g., alternative modes at the physical medium layer (wires versus optical fibers) and alternative modes at the transport layer (different protocols). However, only one selection is considered in the process flow of FIG. 3. A parallel process flow may be executed for other mode selections.

The selection of the session mode at step 70 is made using present-time QoS values input at step 72, rather than using the QoS guaranteed values of the modes. Again referring to the table of FIG. 4, the present-time QoS values at time 1 (t1) are shown in the fourth column 74. Still using the example from above, since the QoS requirements of the particular session designate a QoS value of 6, the LAN connection or the Frame Relay connection may be used at a lesser cost, but with acceptable performance. In the preferred embodiment of the invention, the Frame Relay connection is selected, since it establishes the highest quality of service at a tariff that does not exceed the "acceptable session tariff" of the ATM connection, i.e., a session tariff of 2. While a tariff-free session is available using the LAN connection, this mode does not provide the best available present-time QoS within the tariff range.

The selection of the session mode at step 70 also considers the pattern of present-time QoS values for the modes. That is, the pattern of behavior of the present-time QoS values is analyzed to predict whether a particular mode will have a continued present-time quality of service that satisfies the requirements of a session. If the quality of service of the particular mode has been fluctuating significantly for the time period immediately preceding the request to establish a session, the mode may be determined to be inappropriate for establishing the session. The analysis of the pattern of behavior is also implemented in in-session switching, reducing the likelihood that repeated mode switching will increase the cost of the session.

In step 76 of FIG. 3, the selected session mode is used to implement the session. However, the process is contained in order to ensure that the quality of service is maintained throughout the duration of the session and to provide the highest QoS at a tariff that does not exceed the previously defined acceptable session tariff. In step 78, the monitor device 24 of FIG. 1 continues to monitor the various network access points 12, 14, 16, 18, 20 and 22. The continuous monitoring process allows the present-time QoS table 28 to be updated as changes are detected. The updates are executed at step 80 of FIG. 3. Referring again to the table of FIG. 4, the present-time QoS parameter values changed for the first four modes during the time between t1 and t2. The t2 values are found in the fifth column 82 of the table. Because the previously selected mode, i.e. the Frame Relay connection, no longer provides the required QoS, the system switches from this mode. In FIG. 3, a decision is executed at step 84 as to whether the selected mode still has the highest quality of service at the acceptable session tariff defined in step 60. If this query results in a positive response, the process returns to step 78. On the other hand, if the response is negative, such as in the situation of table 4, a step 86 of switching to an alternative mode is executed. The alternative mode must still satisfy all of the QoS requirements of the session and must be at or below the predefined acceptable session tariff. Moreover, the analysis of the pattern of behavior of the alternative mode with respect to QoS must indicate that the alternative mode is sufficiently stable over time to sustain the required QoS. This prediction is based upon the data that is stored with each update of the QoS table in step 80. In the table of FIG. 4, there are two separate and equally important reasons why the Frame Relay connection would be torn down and the ATM connection would be established. Firstly, the Frame Relay connection no longer provides the required QoS at time t2. Secondly, the ATM connection now provides the highest QoS at the tariff that does not exceed the acceptable session tariff. Consequently, even if the Frame Relay connection still provided a QoS value of 7, the switch would be made to the ATM connection.

In the preferred embodiment, the mode switching step 86 includes some "hysteresis." For example, if the cost of switching modes is substantial and the original mode still provides the required quality of service, the switching step is inhibited. Step 88 provides the switching costs to make such a determination. Inhibiting the switching may also be a result of repeated switches.

While the preferred embodiment of the invention implements the switches based upon providing the highest quality of service at a session tariff that does not exceed a defined tariff, another embodiment does factor cost during in-session switching. In this embodiment, at least some of the available modes are distinguishable with respect to protocol and one of the available protocols is the Internet Protocol (IP). In FIG. 3, steps 54, 56, 58, 60 and 62 are preferably executed in the same manner described above. In step 70, the quality of service and the session tariffs of the available modes are considered. At time t1, the LAN connection will be selected, since the present-time QoS has a value 6 that satisfies the requirements of the session (i.e., QoS=6), and the LAN connection is less expensive than the Frame Relay connection that was selected in the previously described embodiment. Steps 76, 78 and 80 are executed in the same manner described above, but the decision at step 84 again factors in the session tariffs of the modes.

Figure 5:
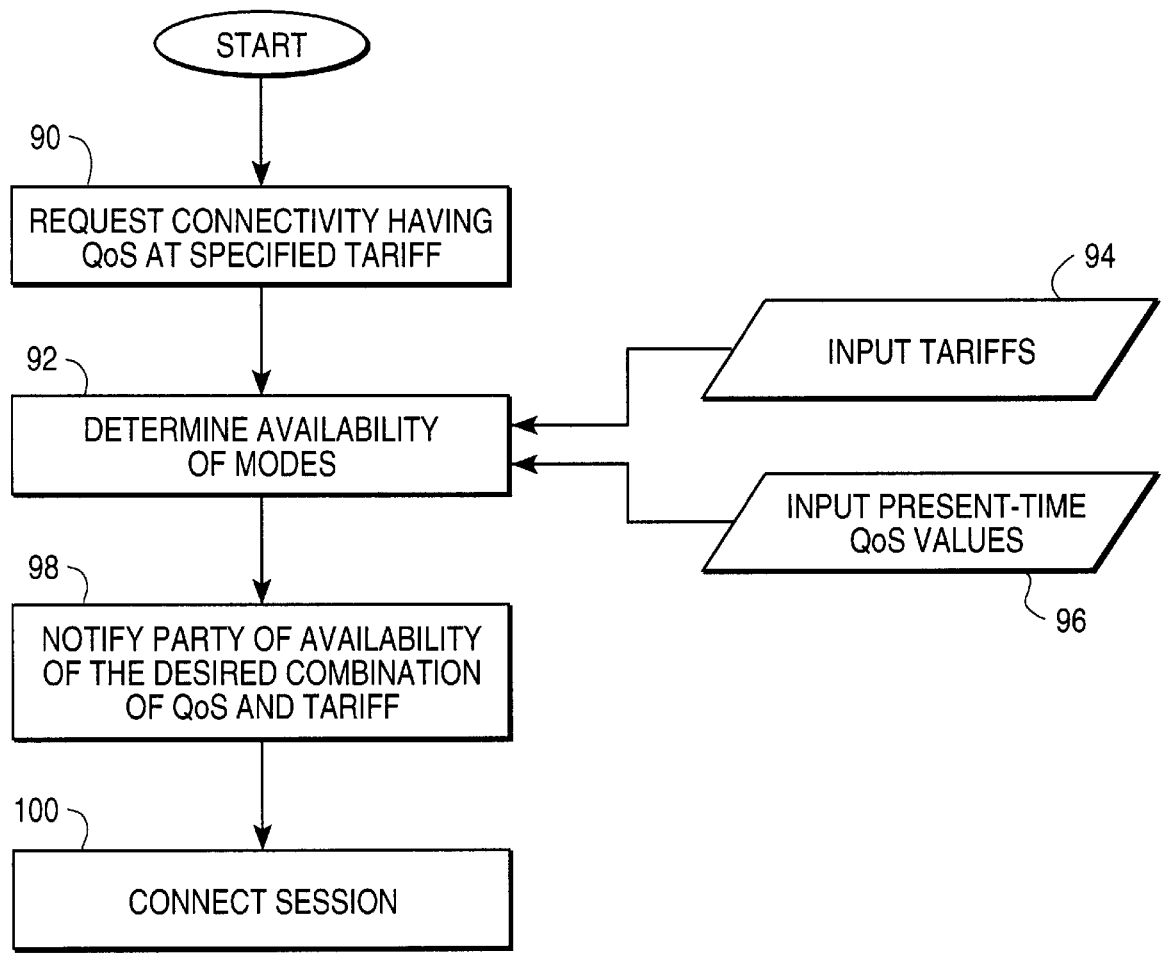
FIG. 5 is a flow chart of steps for selecting among the communications modes of FIG. 1 in accordance with an alternative embodiment of the invention.

FIG. 5 illustrates a third embodiment of the invention. In this embodiment, a request is received at step 90 to establish connectivity for a communications session, such as a multimedia session. The request includes either an implied or a specified quality of service. The implication of the quality of service may be determined based upon the identification of the type of session that is to be established. For example, a request to establish a videoconference implies a relatively high quality of service. The tariff that is specified may also be implied. Referring briefly to FIG. 4, a request for an ATM connection automatically implies that a user is willing to pay a session tariff of value "2." If the session tariff is indicated to have a value of "2" and the requested QoS has a value of "8," at time t1 none of the modes of the table will satisfy the connectivity request. Thus, the connectivity request is temporarily suspended. In FIG. 5, the determination of the availability of a suitable mode is at step 92, with tariff and QoS inputs of steps 94 and 96.

If at step 92 it is determined that one of the modes has the required present-time QoS at or below the specified tariff, the connection is established. On the other hand, if as noted above there is a situation in which none of the available modes has a present-time QoS at the acceptable tariff, the request is looped at step 92 until an update of the QoS value shows that the required values are now available at the acceptable tariff. During that time, the caller is free to remain off-line. At time t1 in the table of FIG. 4, none of the available modes has the acceptable combination of QoS and tariff. However, at the update of time t2, the ATM connection has the present-time QoS value of "9," which is above the specified value of "8." In step 98, the party is notified that a mode having an acceptable QoS at an acceptable tariff is now available, and in step 100 the session is initiated. The notification at step 98 preferably requests a party to verify that the session is still desired, prior to initiating the session at step 100. However, such a request is not critical. In fact, notification prior to session connection is not critical.

An advantage of the embodiment of FIG. 5 is that a call that is not schedule-critical can be conducted without paying the session tariff typically associated with the quality of service requested by the caller. While the quality of service may degrade after the session is established, this concern may be reduced by monitoring the pattern of QoS behavior for the modes before the connection is made.

I claim:

1. A method of managing communications routing comprising steps of:

accessing capability to exchange communication data between remotely located sites using any of a plurality of distinct communications modes having pre-established quality of service parameter values and pre-established session tariffs;

monitoring at least some of said modes to determine present-time quality of service parameter values for said modes;

receiving requests to establish communications sessions such that each session has quality of service requirements;

determining an acceptable session tariff for each of said sessions based upon comparing said quality of service requirements to said pre-established parameter values for said plurality of modes;

selecting among said modes on a session-by-session basis to determine which of said modes provides a highest present-time quality of service at a session tariff which is at or below said acceptable session tariff, said highest present-time quality of service being based upon said determined present-time parameter values for said plurality of modes; and utilizing said selected modes on a session-by-session basis to implement said sessions.

2. The method of claim 1 further comprising a step of executing in-session switching from said selected mode to an alternative mode in response to detecting that said alternative mode has a session tariff at or below said acceptable session tariff and a higher present-time quality of service than said selected mode.

3. The method of claim 2 wherein said step of executing in-session switching includes weighting said pre-established session tariff of said alternative mode in determining whether to switch to said alternative mode, said weighting being indicative of a connection cost for utilizing said alternative mode.

4. The method of claim 1 wherein said step of determining an acceptable session tariff includes determining which of said modes are acceptable with respect to satisfying said quality of service requirements for a particular session and further includes identifying which one of said acceptable modes has a lowest pre-established session tariff, said lowest pre-established session tariff thereby being designated the acceptable session tariff.

5. The method of claim 1 wherein said step of accessing capability to exchange communication data includes providing access to various modes for implementing real-time multimedia sessions.

6. The method of claim 5 wherein said step that includes providing access to said various modes includes providing a selection of modes that are distinguishable with respect to protocol, with one of said modes utilizing the Internet Protocol.

7. The method of claim 1 wherein said step of receiving requests is a step of receiving requests to establish a telecommunications session having specified quality of service parameter values.

8. The method of claim 1 wherein said steps of monitoring said modes and selecting among said modes are executed during said sessions to enable in-session switching between modes that each satisfy said quality of service requirements of a particular session.

9. The method of claim 8 further comprising a step of in-session switching from a particular mode when it is determined that said present-time parameter values of said particular mode no longer satisfy said quality of service requirements of said particular session.

10. The method of claim 8 further comprising a step of reserving communications resources of an unselected mode such that each session has reserved communications resources for said in-session switching, said unselected mode for said particular session being that mode which satisfies requested quality of service requirements of said particular session at said acceptable session tariff for said particular session.

11. A method of managing transmissions between remote sites during a real-time multimedia session comprising steps of:
receiving requested quality of service requirements for said multimedia session;
selecting among a plurality of available communications modes for conducting said multimedia session, including selecting among modes that are distinguishable with respect to protocols, one of said protocols being an Internet Protocol, selection of a first mode being at least partially based upon differences in quality of service parameters for said modes;
continuously monitoring available present-time quality of service for each of said modes such that variations in quality of service for said modes are detected; and
while said multimedia session is in progress, switching from said first mode to a second mode upon detection that said second mode has a present-time quality of service satisfying said requirements of said multimedia session and that utilizing said second mode is more cost-efficient than said first mode utilized in conducting said multimedia session.

12. The method of claim 11 wherein said step of selecting among said modes further includes selecting from among modes distinguishable with respect to transmission media, including analog lines and digital lines.

13. The method of claim 11 further comprising a step of continuously reserving resources of one of said modes having pre-established quality of service parameters satisfying said requirements of said multimedia session, such that said reserved resources remain available to said multimedia session.

14. The method of claim 11 further comprising a step of switching from said second mode upon detection that either said second mode no longer satisfies said requirements or that a third mode satisfies said requirements and is more cost-efficient than said second mode.

15. The method of claim 11 wherein said step of selecting among said modes includes selecting said first mode based upon present-time qualities of service and upon session tariffs of said modes.

16. A method of managing communications routing comprising steps of:
accessing capability to exchange communication data between remotely located sites using any of a plurality of distinct communications modes having pre-established session tariffs;
monitoring said modes to determine present-time quality of service parameter values for said modes;
receiving a request to establish a communications session such that said request indicates a minimum quality of service and a maximum session tariff;
if one of said modes satisfies said indicated minimum quality of service without exceeding said maximum session tariff, establishing connectivity for said session utilizing said one of said modes; and
if none of said modes satisfies said indicated minimum quality of service without exceeding said maximum session tariff, then
(a) queuing said request;
(b) tracking said monitored present-time quality of service parameter values for said modes until a specific mode has a present-time quality of service that satisfies said indicated minimum quality of service without exceeding said maximum session tariff; and
(c) selecting said specific mode for establishing connectivity for said session.

17. The method of claim 16 further comprising a step (d) of notifying a user of availability of said specific mode subsequent to said step (c) of selecting said specific mode and prior to establishing connectivity.

18. A system for managing real-time communications sessions comprising:
a plurality of types of interfaces to provide connections for conducting a communications session, different interfaces being compatible with different communications modes, each mode having a pre-established session tariff and pre-established quality of service parameter values;
means for comparing quality of service requirements of said session with said pre-established parameter values of said modes to select a subset of modes suitable for supporting said session;
means, responsive to said comparing means, for designating a threshold session tariff for conducting said session, said threshold session tariff being a lowest pre-established session tariff of said subset of modes;
means connected to said interfaces for continuously monitoring present-time quality of service available for each of said modes; and
means for switching modes during support of said session in response to said monitoring means detecting a mode having increased present-time quality of service and a pre-established session tariff not exceeding said threshold session tariff.

19. The system of claim 18 wherein said interfaces include at least one analog interface and at least one digital interface.

20. The system of claim 18 wherein said interfaces support multimedia sessions and at least one interface supports communications using Internet Protocol.

* * * * *